US012784563B2

(12) United States Patent
Ye et al.

(10) Patent No.: US 12,784,563 B2
(45) Date of Patent: Nov. 3, 2026

(54) MULTI-LAYER EARLY WARNING AND MONITORING SYSTEM AND METHOD FOR FOREST FIRE PREVENTION APPLYING BIG DATA TECHNOLOGY

(71) Applicant: Nanjing Forestry University, Nanjing (CN)

(72) Inventors: Qiaolin Ye, Nanjing (CN); Demin Gao, Nanjing (CN); Wenjing Chen, Nanjing (CN)

(73) Assignee: Nanjing Forestry University, Nanjing (CN)

( * ) Notice: Subject to any disclaimer, the term of this patent is extended or adjusted under 35 U.S.C. 154(b) by 53 days.

(21) Appl. No.: 18/586,608

(22) Filed: Feb. 26, 2024

(65) Prior Publication Data

US 2024/0296726 A1 Sep. 5, 2024

(30) Foreign Application Priority Data

Mar. 2, 2023 (CN) ......................... 202310192247.7

(51) Int. Cl.
*G08B 17/10* (2006.01)
*G06V 10/70* (2022.01)
(Continued)

(52) U.S. Cl.
CPC ............. *G08B 17/10* (2013.01); *G06V 10/70* (2022.01); *G06V 20/13* (2022.01); *G06V 20/52* (2022.01); *H04N 7/181* (2013.01)

(58) Field of Classification Search
None
See application file for complete search history.

(56) References Cited

U.S. PATENT DOCUMENTS 8,760,285 B2 * 6/2014 Billman ................. G06Q 40/08 340/539.11
10,002,510 B2 * 6/2018 Ryder .................... G08B 17/00
(Continued)

OTHER PUBLICATIONS

Elijah et al., An Overview of Internet of Things (IOT) and Data Analytics in Agriculture: Benefits and Challenges, 5, Oct. 2018 (Year: 2018).*

*Primary Examiner* — Muhammad Adnan
(74) *Attorney, Agent, or Firm* — S.J. INTELLECTUAL PROPERTY LTD.

(57) ABSTRACT

Disclosed is a multi-layer early warning and monitoring system and method for forest fire prevention applying big data technology, the multi-layer early warning and monitoring system including a forest area monitoring module, an environmental early warning module and an aerial photography monitoring module. The forest area monitoring module is configured to simulate a human activity trajectory, arrange alarm and monitoring devices on the basis of characteristics of different forest farms, and manage the same in a unified manner. The environmental early warning module is configured to carry out early warning of high temperature, drought and high wind conditions by utilizing weather forecasts and combining with actual situations in the forest farm. The aerial photography monitoring module is configured to calculate a dense smoke range and intensity on the basis of aerial photographed images to design a relief route and evacuate involved people.

7 Claims, 2 Drawing Sheets

(51) Int. Cl.

| | |
|---|---|
| ***G06V 20/13*** | (2022.01) |
| ***G06V 20/52*** | (2022.01) |
| ***H04N 7/18*** | (2006.01) |

(56) References Cited

U.S. PATENT DOCUMENTS

| | | | | |
|---|---|---|---|---|
| 10,650,285 | B1 * | 5/2020 | Okazaki | G06N 3/0464 |
| 11,275,989 | B2 * | 3/2022 | Tschernezki | G06N 3/044 |
| 12,142,125 | B2 * | 11/2024 | Shao | G06V 10/82 |
| 12,198,146 | B2 * | 1/2025 | Zeng | G06Q 10/04 |
| 2014/0132409 | A1 * | 5/2014 | Billman | G08B 19/00 463/31 |
| 2014/0192184 | A1 * | 7/2014 | Wu | G08B 17/125 348/135 |
| 2016/0313120 | A1 * | 10/2016 | Shishalov | H04N 23/62 |
| 2018/0122221 | A1 * | 5/2018 | Norton | G08B 29/145 |
| 2018/0218214 | A1 * | 8/2018 | Pestun | G06V 20/176 |
| 2018/0336452 | A1 * | 11/2018 | Tschernezki | G06N 3/0442 |
| 2020/0143212 | A1 * | 5/2020 | Okazaki | G06V 20/176 |
| 2021/0152834 | A1 * | 5/2021 | Guruva reddiar | H04N 19/154 |
| 2021/0192175 | A1 * | 6/2021 | Pineda | G06F 18/214 |
| 2022/0365816 | A1 * | 11/2022 | Dadkhah Tehrani | G06F 9/4881 |
| 2023/0108318 | A1 * | 4/2023 | Graf Fernandes | G06V 10/25 382/181 |
| 2023/0147316 | A1 * | 5/2023 | Park | G06V 10/70 340/577 |
| 2023/0289381 | A1 * | 9/2023 | McCarson | G06F 16/587 |
| 2024/0185560 | A1 * | 6/2024 | Choi | G06V 10/25 |
| 2024/0233367 | A1 * | 7/2024 | Motayed | G01S 13/90 |
| 2024/0256598 | A1 * | 8/2024 | McCarson | G06V 10/764 |
| 2024/0265047 | A1 * | 8/2024 | McCarson | G06F 18/217 |
| 2024/0346308 | A1 * | 10/2024 | Okazaki | G06T 7/0002 |

* cited by examiner

MULTI-LAYER EARLY WARNING AND MONITORING SYSTEM AND METHOD FOR FOREST FIRE PREVENTION APPLYING BIG DATA TECHNOLOGY

CROSS-REFERENCE TO RELATED APPLICATIONS

This application claims priority of Chinese Patent Application No. 202310192247.7, filed on Mar. 2, 2023, the entire contents of which are incorporated herein by reference.

TECHNICAL FIELD

The present disclosure relates to the field of forest fire prevention, and specifically to a multi-layer early warning and monitoring system and method for forest fire prevention applying big data technology.

BACKGROUND

Internet of Things (IoT) technology, based on the high-speed developed communication technology and hardware updates, interconnects hardware through network, realizing the access of equipment to network, so that hardware equipment can be controlled and monitored through network, and receive instructions from a remote control terminal. As a terminal, IoT technology is utilized to form an interconnected IoT network through different topological structures, and manage the hardware equipment in a unified manner on the basis of Internet road.

Forest areas are so rich in resources that are divided into protection forests, timber forests, fuelwood forests and special-purpose forests. Due to different latitudes and geographical conditions, forest fires occur frequently in some forest areas. It is usually difficult to contain the forest fires after reaching a large scale, which are burning in a large scale and last for a long period of time, causing large losses of natural resources and economic property. Fighting forest fires requires lots of manpower, which is difficult and prone to casualties among rescuers. For preventing the occurrence and spread of forest fires, timely detection and early warning are to be made at an initial burning stage. Existing alarm facilities monitor the forest for burning conditions by detecting smoke and temperature in the forest and alarm quickly. Although the existing facilities can detect the occurrence of forest fires, due to the long-term placement in the field, the device is prone to failure. At the same time, the management of the device is not fine enough to accurately monitor and maintain each piece of equipment, so that device failures cannot be detected. There is also the problem of random arrangement, resulting in the alarm and monitoring devices to be far away from fire points, beyond a monitoring range, and therefore the best window period to fight the fire is missed.

A multi-layer early warning and monitoring system and method for forest fire prevention applying big data technology is proposed to solve the above problems.

SUMMARY

An objective of the present disclosure is to provide a multi-layer early warning and monitoring system and method for forest fire prevention applying big data technology to solve the problems raised in the above background.

In order to solve the problems described above, the present disclosure provides the following technical solutions: a multi-layer early warning and monitoring system and method for forest fire prevention applying big data technology. The early warning and monitoring system includes a three-layer early warning and monitoring mechanism, including a forest area monitoring module based on geographic areas, an environmental early warning module based on weather conditions and an aerial photography monitoring module based on aerial equipment.

The forest area monitoring module is configured to pertinently arrange alarm devices on the basis of a current geographic location and characteristics of a forest farm to monitor and detect combustible objects in an area of high human activity.

Therefore, the devices focus on monitoring flammable areas in a forest area and focus on monitoring flammable trees, and capture fire-prone points in the forest area, to timely detect abnormally high temperature and fire points.

The environmental early warning module is configured to carry out early warning of high temperature and persistent drought conditions according to weather forecasts.

Therefore, forest rangers schedule inspections in advance on the basis of weather forecast information to detect potential fire points.

The aerial photography monitoring module is configured to carry out fire monitoring and fire spread analysis on the basis of images taken by aerial equipment.

Therefore, firefighting personnel build isolated firebreaks safely and effectively to stop the fire from continuing to spread.

According to the above technical solution, the forest area monitoring module includes an area monitoring unit, an image monitoring unit and a device management unit.

The area monitoring unit is configured to acquire a geographic location of a current forest area by utilizing a positioning system, read, from a database, the species and the number of trees of a forest in a corresponding forest area, and arrange monitoring and alarm devices accordingly to improve the pertinence of monitoring and alarms; the image monitoring unit is configured to identify flammable points and high heat locations by means of an infrared lens to detect burning hazards; and the device management unit is configured to manage the alarm devices in the area in a unified manner and optimize the arrangement of the devices.

According to the above technical solution, the environmental early warning module includes a temperature early warning unit, a drought early warning unit and a wind force early warning unit.

The temperature early warning unit is configured to monitor temperature conditions in a forest by means of temperature detectors in the forest farm, alarm for continuous high temperature conditions and extreme high temperature conditions, collect weather information through interfaces, and regulate and control risk levels of a fire early warning through the prediction of future temperature conditions; the drought early warning unit is configured to detect humidity conditions in the forest farm by means of humidity detectors in the forest farm, and predict drought duration by collecting precipitation information; and the wind force early warning unit is configured to be turned on under drought and high temperature conditions to monitor a wind force and a wind direction at a present day, and determine the impact of the wind force on the area.

According to the above technical solution, the aerial photography monitoring module includes an information acquisition unit, an image analysis unit and an intelligent pre-determination unit.

The information acquisition unit is configured to be accessed to entry ends of different satellites and aerial equipment to acquire open image resources of remote sensing in real time, and download the same to a local system; the image analysis unit is configured to retrieve images of a fire scene, and analyze the same to study and determine a burning range and spread direction of a fire; and the intelligent pre-determination unit is configured to determine burning duration and an influence range of dense smoke of the fire on the basis of the results of image analysis, and provide a plan direction for a firefighting plan.

A multi-layer early warning and monitoring method for forest fire prevention applying big data technology includes the following steps of:

S1. acquiring geographic and forest farm information about an area to arrange monitoring and alarm devices and manage the same in a unified manner;

S2. inspecting and identifying flammable points and high heat areas in a forest farm to detect burning hazards;

S3. capturing temperature and humidity data in the forest farm to study and determine fire early warning levels in combination with meteorological conditions; and S4. monitoring a fire scene, and analyzing fire information by means of thermal imaging images to determine a fire spread direction and pre-determine burning duration and a final influence range of a fire.

In step S1, an area where a current forest farm is located is located, and losses caused by a fire in the forest farm are calculated according to a type and size of the forest farm. Priorities for early warning and monitoring are ranked, and the monitoring devices and alarm devices are arranged according to characteristics and distribution locations of trees in the forest farm. Forests are generally categorized as protection forests, timber forests, fuelwood forests and special-purpose forests by species, of which, the timber forests and special-purpose forests are of high economic and scientific value and the fuelwood forests are inflammable. The high-value timber forests and special-purpose forests, as well as the inflammable fuelwood forests are subject to focused monitoring. The device management unit carries out monitoring, management and unified scheduling of all alarm and monitoring devices in the forest farm. The devices are arranged according to the frequency of human activities in the forest farm. Target points of an activity area in the forest farm are demarcated to predict and plan an activity path of creatures, and the monitoring and alarm devices are arranged along the path. An artificial potential field algorithm is used to establish the path, the specific steps of which are as follows:

S101: constructing a gravitational field in a potential field, and using a parabolic gravitational field model $$\rho_{att}(q)=\frac{1}{2}\delta\|q-q_f\|^2,$$

where δ represents a gravitational gain, i.e. the gain is the attraction of a target to the creatures and is expressed as a constant, q represents a location of a current point, and $q_f$ represents a location of a target point, the gravitational field expressing an attraction effect of the target on the creatures;

S102: constructing a repulsive field in the potential field to express an repulsive effect of an obstacle on the creatures; a potential field value approaching to infinity when the creatures approach a boundary of the obstacle, and the potential field value decreasing to 0 when a distance from the creatures to the boundary of the obstacle exceeds a certain specified distance; and setting p(q) as a distance from the creatures to the boundary of the obstacle, p(q)=min‖q−q'‖, q' representing a location of the obstacle and being located within the boundary of an obstacle area, thereby obtaining a function of a repulsive potential field, $$\rho_{rep}(q)=\begin{cases}\frac{1}{2}\gamma\left(\frac{1}{p(q)}-\frac{1}{p_0}\right)^2 & :p(q)\le p_0,\ \ p_0\\ 0:p(q)>p_0\end{cases}$$

representing a distance influenced by the obstacle, and γ representing a repulsive force gain;

S103: constructing the potential field, the potential field $\rho(q)=\rho_{att}(q)+\rho_{rep}(q)$, the potential field being a sum of the gravitational field and the repulsive field;

S104: solving a trajectory using a gradient descent method: from an initial configuration, advancing a length of m in a direction of a negative gradient of the potential field, repeating at a new configuration, and advancing a length of m in the direction of the negative gradient of the potential field until a final configuration point is reached. An iterative algorithm of the gradient descent method is described in detail below:

S104_1: from a starting point, advancing a length of m in the direction of the negative gradient of the potential field, $q_{init}\rightarrow q_0, 0\rightarrow i$, i being assigned a value of 0 from an initial point to a first constructed point;

S104_2: if $q_i != q_{final}$, carrying out iteration to allow $$q_{i+1}=q_i+\beta_i\frac{F(q_i)}{\|F(q_i)\|};$$

i being increased by 1; if $q_i=q_{final}$, a target endpoint being reached, and then outputting an array $<q_0, q_1, q_2 \ldots q_i>$; $\beta_i$ being a coefficient, determining an advance distance at an $i_{th}$ iteration, and $q_i$ representing a current construction after the $i_{th}$ iteration; and an array of construction points containing the results of each iteration being a final path obtained by planning; and

S104_3: returning to step S104_2; and after the path is planned, the monitoring and alarm devices are arranged on the activity path in accordance with construction points, and at the same time, the monitoring and alarm devices are arranged at an intermediate point taken between two construction points which are farther apart according to distances between the construction points, the monitoring and alarm devices including a humidity sensor, a high temperature monitor, a movable camera and an infrared monitor, and each of the alarm devices including a signal module for communicating with a system.

In step S2, the monitoring and alarm devices are utilized to detect high temperature and flammable points in an area within the forest farm, and identify reflective objects and flammable objects by images. The image detection unit is based on an intelligent camera to initially monitor an abnormal temperature on a surface of an object by means of a temperature-sensitive lens, and alarms for a temperature exceeding a threshold value. In a smoldering stage, smoke emitted from the object is identified and alarm is performed on the basis of a smoke detection instrument. In a burning stage, a flame is detected on the basis of a visible light camera, indicating that a fire is initially formed, and the device alarms and uploads fire information including location information and fire pictures. Concentrating light by some light-concentrating objects and projecting the light onto dead branches and leaves also involves a fire risk, and the light-concentrating objects are located by image identification, that is, a high-definition camera is set up at a high position and runs in 360° to acquire images in the forest farm, and the images are processed as follows:

- S201: converting the images to gray-scale images and performing parallel filtering to reduce high frequency noise;
- S202: thresholding the gray-scale images, setting a pixel value P of a portion where a pixel value exceeds x as 255 and the pixel value P of a portion where a pixel value is less than x as 0, and highlighting highlighted areas in blurred images;
- S203: performing erosion and dilation to remove noise from the images;
- S204: plotting spots in the images, at which time the spots are the highlighted areas; and
- S205: marking the spots as $A_i$, i=1, 2, 3 . . . , connecting the spots in accordance with a uniform direction, eliminating spots near a straight line, selecting scattered spots, and no straight line being formed by random light-concentrating objects according to a law of discrete, thereby determining that the spots constituting a straight line are image highlights caused by direct sunlight.

This image processing process can be realized in several image processing software. The system can be embedded with these software to realize fast processing to get the highlights, and upload the images containing the highlights to the system, and personnel is arranged to deal with these light-concentrating objects.

In step S3, the environmental early warning module is accessed to an interface of a meteorological website, captures meteorological information about the forest farm for the next n days on the basis of area information about the forest farm located by the system, and determines the possibility of inducing a forest fire according to precipitation, temperature, wind speed and relative humidity. If 30-day precipitation is less than a threshold value, the forest farm is more arid, and the probability of fire becomes larger. The data is monitored combined with the humidity in the forest farm, and if the humidity is less than a critical point, the early warning level is increased. Upon hot weather occurs, the system monitors a maximum daytime temperature and combines the same with the effect of wind force and direction on forest fires. If a daily difference in temperature is greater than m° C., the wind force is stronger, which is more conducive to fire burning. Combined with a forest fire spread formula, $R=R_0K_SK_WK_F$, where $K_S$ represents a correction coefficient of combustible configuration pattern in the forest farm, $K_W$ represents a wind speed adjustment coefficient, $K_F$ represents a terrain slope adjustment coefficient, and $R_0$ represents an initial spread rate, $R_o=aT+bv+ch-D$, where T represents a maximum daily temperature, W represents an average midday wind level, h represents a minimum daily humidity, and a, b, c and D represent constant coefficients. The fire early warning level is increased upon the forest fire spread rate R under the meteorological condition exceeds a threshold value.

In step S4, for a forest farm where a fire breaks out, a system instantly captures data upon obtaining alarm information from the devices, locates nearest aerial equipment, and requests for image information about the forest farm. A burning range can be obtained on the basis of the forest fire spread rate in step S3, and a fire smoke diffusion model based on Gaussian distribution is introduced on the basis of the burning range. A smoke concentration at a certain point within a fire range is $$C = C_0 + S * e^{\frac{-r^2}{b}} * T_{WS}T_{WW}T_{WF},$$

where $C_0$ represents a smoke concentration value under current natural conditions, $T_{WS}$ represents a wind speed influence coefficient, $T_{WW}$ represents a wind direction influence coefficient, $T_{WF}$ represents a humidity influence coefficient, S represents a smoke intensity at a fire point source, b represents Gaussian distribution parameters, and r represents a distance from the fire point source. A smoke concentration of each place inside a fire scene and a smoke concentration of a residential area outside the fire scene are calculated, residents in an affected residential area are organized to evacuate, and a relief route that is less affected by the smoke is designed for firefighting personnel.

Compared with the prior art, the present disclosure has the following beneficial effects.

1. In the present disclosure, trajectory planning is simulated, the activity path is calculated, and the monitoring and alarm devices are arranged according to the activity path to maximize the monitoring of human activity-induced fires, and the alarm devices are managed in a unified manner.
2. In the present disclosure, the light-concentrating objects in the forest farm are detected, objects of high brightness are located by image identification, and patrol personnel are arranged to deal with those objects, avoiding the ignition of flammable objects such as dead leaves in the forest farm caused by the light-concentrating objects.
3. In the present disclosure, the fire smoke diffusion model based on Gaussian distribution is introduced to calculate smoke concentrations in different areas within the fire burning range, and calculate the spread range of the dense smoke, which is conducive to the firefighting personnel to avoid the area of high smoke concentration, and organize the residents of the affected residential areas near the fire to evacuate in advance.

BRIEF DESCRIPTION OF THE DRAWINGS

The accompanying drawings, as a part of the specification, are used for further understanding the present disclosure, and are used for explaining the present disclosure together with examples of the present disclosure, and do not constitute a limitation on the present disclosure. In the accompanying drawings.

DETAILED DESCRIPTION

The technical solutions of the examples in the present disclosure will be described clearly and completely by reference to the accompanying drawings of the examples in the present disclosure below. Obviously, the examples described are only some, rather than all examples of the present disclosure. Based on the examples of the present disclosure, all other examples obtained by those ordinary skilled in the art without creative efforts fall within the scope of protection of the present disclosure.

Figure 1:
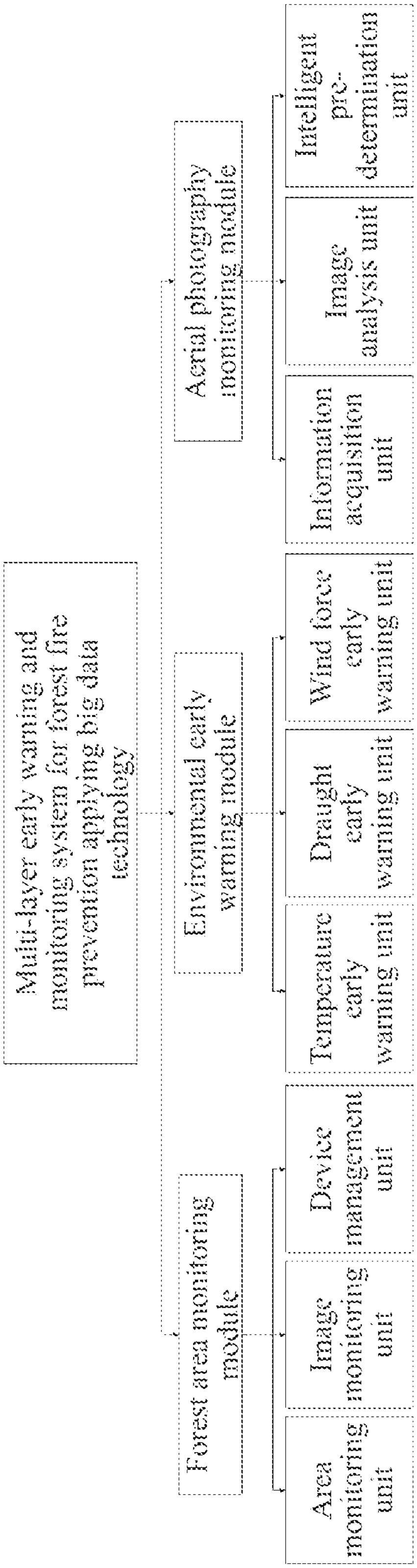
FIG. 1 is a constitutional diagram of modules of a multi-layer early warning and monitoring system for forest fire prevention applying big data technology according to the present disclosure.
Figure 2:
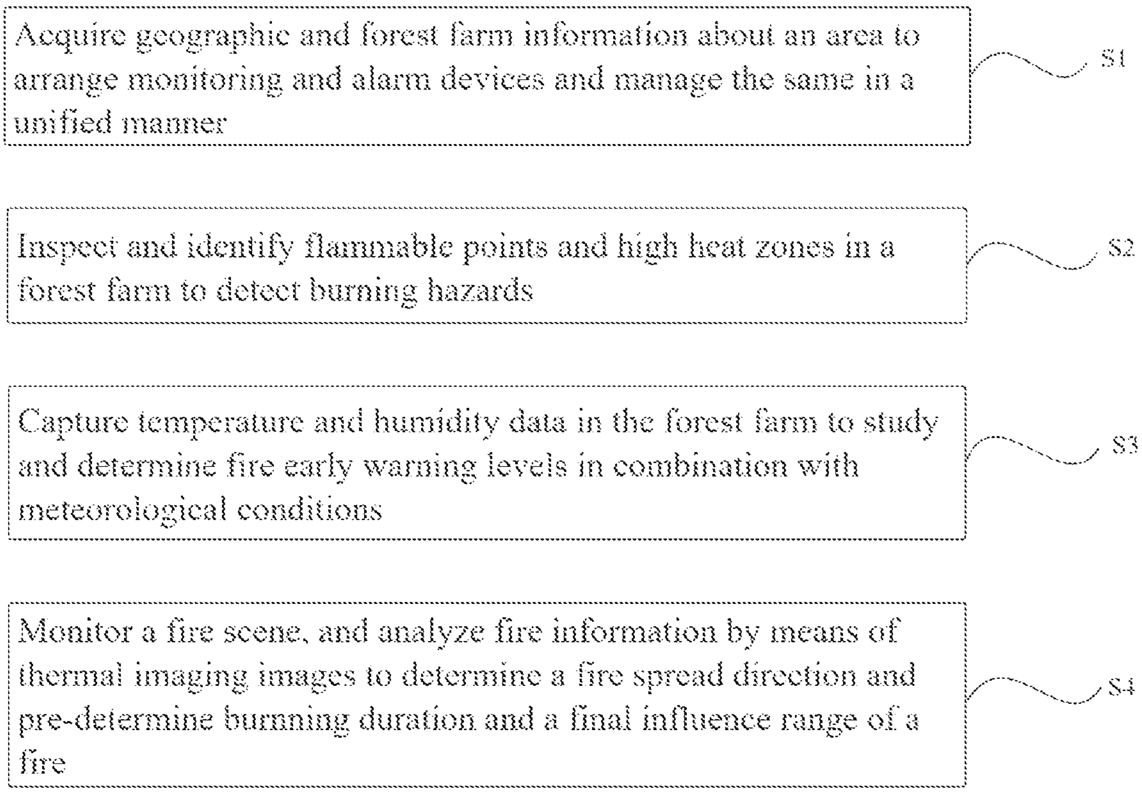
FIG. 2 is a schematic diagram of steps of a multi-layer early warning and monitoring method for forest fire prevention applying big data technology according to the present disclosure.

As shown in FIG. 1 and FIG. 2, the present disclosure provides the following technical solutions: a multi-layer early warning and monitoring system and method for forest fire prevention applying big data technology. The early warning and monitoring system includes a three-layer early warning and monitoring mechanism, including a forest area monitoring module based on geographic areas, an environmental early warning module based on weather conditions and an aerial photography monitoring module based on aerial equipment.

The forest area monitoring module is configured to pertinently arrange alarm devices on the basis of a current geographic location and characteristics of a forest farm to monitor and detect combustible objects in an area of high human activity.

Therefore, the devices focus on monitoring flammable areas in the forest area and focus on monitoring flammable trees, and capture fire-prone points in the forest area, to timely detect abnormally high temperatures and fire points.

The environmental early warning module is configured to carry out early warning of high temperature and persistent drought conditions according to weather forecasts.

Therefore, forest rangers schedule inspections in advance on the basis of weather forecast information to detect potential fire scenes.

The aerial photography monitoring module is configured to carry out fire monitoring and fire spread analysis on the basis of images taken by aerial equipment.

Therefore, firefighting personnel build isolated firebreaks safely and effectively to stop the fire from continuing to spread.

According to the above technical solution, the forest area monitoring module includes an area monitoring unit, an image monitoring unit and a device management unit.

The area monitoring unit is configured to acquire a geographic location of a current forest area by utilizing a positioning system, read, from a database, the species and the number of trees of a forest in a corresponding forest area, and arrange monitoring and alarm devices accordingly. The image monitoring unit is configured to identify flammable points and high heat locations by means of an infrared lens to detect burning hazards. The device management unit is configured to manage the alarm devices in the area in a unified manner and optimize the arrangement of the devices.

According to the above technical solution, the environmental early warning module includes a temperature early warning unit, a drought early warning unit and a wind force early warning unit.

The temperature early warning unit is configured to monitor temperature conditions in a forest by means of temperature detectors in the forest farm, alarm for continuous high temperature conditions and extreme high temperature conditions, collect weather information through interfaces, and regulate and control risk levels of a fire early warning through the prediction of future temperature conditions. The drought early warning unit is configured to detect humidity conditions in the forest farm by means of humidity detectors in the forest farm, and predict drought duration by collecting precipitation information. The wind force early warning unit is configured to be turned on under drought and high temperature conditions to monitor a wind force and a wind direction at a present day, and determine the impact of the wind force on the area.

According to the above technical solution, the aerial photography monitoring module includes an information acquisition unit, an image analysis unit and an intelligent pre-determination unit.

The information acquisition unit is configured to be accessed to entry ends of different satellites and aerial equipment to acquire open image resources of remote sensing in real time, and download the same to a local system. The image analysis unit is configured to retrieve images of a fire scene, and analyze the same to study and determine a burning range and spread direction of a fire. The intelligent pre-determination unit is configured to determine burning duration and an influence range of dense smoke of the fire on the basis of the results of image analysis, and provide a plan direction for a fire fighting plan.

A multi-layer early warning and monitoring method for forest fire prevention applying big data technology includes the following steps.

In S1, geographic and forest farm information about an area are acquired, and monitoring and alarm devices are arranged and managed in a unified manner.

In S2, flammable points and high heat areas in a forest farm are inspected and identified to detect burning hazards.

In S3, temperature and humidity data in the forest farm are captured to study and determine fire early warning levels in combination with meteorological conditions.

In S4, a fire scene is monitored, and fire information are analyzed by means of thermal imaging images to determine a fire spread direction and burning duration and pre-determine a final influence range of a fire.

In step S1, an area where a current forest farm is located is located, and losses caused by a fire in the forest farm are calculated according to a type and size of the forest farm. Priorities for early warning and monitoring are ranked, and the monitoring devices and alarm devices are arranged according to characteristics and distribution locations of trees in the forest farm. Forests are generally categorized as protection forests, t timber forests, fuelwood forests and special-purpose forests, of which, the timber forests and special-purpose forests are of high economic and scientific value, and the fuelwood forests are flammable. The high-value timber forests and special-purpose forests, as well as the flammable fuelwood forests are subject to focused monitoring. The device management unit carries out monitoring, management and unified scheduling of all alarm and monitoring devices in the forest farm. The devices are arranged according to the frequency of human activities in the forest farm. Target points of an activity area in the forest farm are demarcated to predict and plan an activity path of creatures, and the monitoring and alarm devices are arranged along the path. An artificial potential field algorithm is used to establish the path, the specific steps of which are as follows.

In S101, a gravitational field in a potential field is constructed, and a parabolic gravitational field model $$\rho_{att}(q) = \frac{1}{2}\delta\|q - q_f\|^2$$

is used. δ represents a gravitational gain, i.e. the gain is the attraction of a target to the creatures and is expressed as a constant. This data is simulated by different models and therefore different values are obtained. In the method, matlab software is used for model constructing and data fitting. q represents a location of a current point, and $q_f$ represents a location of a target point. The gravitational field expresses an attraction effect of the target on the creatures.

In S102, a repulsive field in the potential field is constructed to express an repulsive effect of an obstacle on the creatures. A potential field value approaches to infinity when the creatures approach a boundary of the obstacle, and the potential field value decreases to 0 when a distance from the creatures to the boundary of the obstacle exceeds a certain specified distance. p(q) is set as a distance from the creatures to the boundary of the obstacle, ρ(q)=min||q−q'||, q' representing a location of the obstacle and being located within the boundary of an obstacle area, thereby obtaining a function of a repulsive potential field, $$\rho_{rep}(q) = \begin{cases} \frac{1}{2}\gamma\left(\frac{1}{p(q)} - \frac{1}{p_0}\right)^2 : p(q) \le p_0, \\ 0 : p(q) > p_0 \end{cases}$$

$p_0$ representing a distance influenced by the obstacle, and γ representing a repulsive force gain and being simulated to a constant value by software.

In S103, the potential field is constructed, the potential field $\rho(q)=\rho_{att}(q)+\rho_{rep}(q)$, the potential field being a sum of the gravitational field and the repulsive field.

In S104, a trajectory is solved using a gradient descent method: from an initial configuration, a length of m is traveled in a direction of a negative gradient of the potential field, which is repeated at a new configuration, and a length of m is traveled in the direction of the negative gradient of the potential field until a final configuration point is reached. An iterative algorithm of the gradient descent method is described in detail below.

In S104_1, from a starting point, a length of m is traveled in the direction of the negative gradient of the potential field, $q_{init} \rightarrow q_0$, $0 \rightarrow i$; and i is assigned a value of 0 from an initial point to a first constructed point.

In S104_2, if $q_i != q_{final}$, iteration is carried out to allow $$q_{i+1} = q_i + \beta_i \frac{F(q_i)}{\|F(q_i)\|}.$$

i is increased by 1. If $q_i = q_{final}$, a target endpoint is reached, and an array $\langle q_0, q_1, q_2 \ldots q_i \rangle$ is outputted. $\beta_i$ represents a coefficient, determining an advance distance at an it iteration. $q_i$ represents a current construction after the $i_{th}$ iteration. An array of construction points containing the results of each iteration is a final path obtained by planning.

In S104_3, step S104_2 is returned to.

After the path is planned, the monitoring and alarm devices are arranged on the activity path in accordance with construction points. At the same time, the monitoring and alarm devices are arranged at an intermediate point taken between two construction points which are farther apart according to distances between the construction points, and the construction points are areas of high human activity. Voice broadcasting devices are arranged to prompt information about forest fire ban. The monitoring and alarm devices include a humidity sensor, a high temperature monitor, a movable camera and an infrared monitor, and each of the alarm devices include a signal module for communicating with a system.

In step S2, the monitoring and alarm devices are utilized to detect high temperature and flammable points in an area within the forest farm, and identify reflective objects and flammable objects by images. The image detection unit is based on an intelligent camera to initially monitor an abnormal temperature on a surface of an object by means of a temperature-sensitive lens, and alarms for a temperature exceeding a threshold value. In a smoldering stage, smoke emitted from the object is identified and alarm is performed on the basis of a smoke detection instrument. In a burning stage, a flame is detected on the basis of a visible light camera, indicating that a fire is initially formed, the device alarms and uploads fire information including location information and fire pictures. Concentrating light by some light-concentrating objects and projecting the light onto dead branches and leaves also involves a fire risk, and the light-concentrating objects are located by image identification. A high-definition camera is set up at a high position and runs in 360° to capture images in the forest farm, and the images are processed as follows.

In S201, the images are converted to gray-scale images and parallel filtering is performed to reduce high frequency noise.

In S202, the gray-scale images are thresholded. A pixel value P of a portion where a pixel value exceeds x is set as 255 and the pixel value P of a portion where a pixel value is less than x is set as 0. Highlighted areas in blurred images are highlighted.

In S203, erosion and dilation are performed to remove noise from the images.

In S204, spots in the images are plotted, at which time the spots are the highlighted areas.

In S205, the spots are marked as $A_i$, i=1, 2, 3 . . . , and are connected in accordance with a uniform direction. Spots near a straight line are eliminated and scattered spots are selected. No straight line is formed by random light-concentrating objects according to a law of discrete, and therefore the spots constituting a straight line are determined as image highlights caused by direct sunlight.

This image processing process can be realized in several image processing software. The system can be embedded with these software to realize fast processing to get the highlights, and upload the images containing the highlights to the system, and personnel is arranged to deal with these light-concentrating objects.

In step S3, the environmental early warning module is accessed to an interface of a meteorological website, captures meteorological information about the forest farm for the next n days on the basis of the area information about the forest farm located by the system, and determines the possibility of inducing a forest fire according to precipitation, temperature, wind speed and relative humidity. If 30-day precipitation is less than 100 mm, the forest farm is more arid, and the probability of fire becomes larger. The data is monitored combined with the humidity in the forest farm. If the humidity is less than 55%, the early warning level is increased. Upon hot weather occurs, the system monitors a maximum daytime temperature and combines the same with the effect of wind force and direction on forest fires. If a daily difference in temperature is greater than 7° C., the wind force is stronger, which is more conducive to fire burning. Combined with a forest fire spread formula, $R=R_0K_SK_WK_F$, where $K_S$ represents a correction coefficient of combustible configuration pattern in the forest farm, $K_W$ represents a wind speed adjustment coefficient, $K_F$ represents a terrain slope adjustment coefficient, and $R_0$ represents an initial spread rate $R_o$=aT+bv+ch−D, where T represents a maximum daily temperature, W represents an average midday wind level, h represents a minimum daily humidity, and a, b, c and D represent constant coefficients. The fire early warning level is increased upon the forest fire spread rate R in the meteorological condition exceeds a threshold value.

In step S4, for a forest farm where a fire breaks out, the system instantly captures data upon obtaining alarm information from the devices, locates nearest aerial equipment, and requests for image information about the forest farm. A burning range can be obtained on the basis of the forest fire spread rate in step S3, and a fire smoke diffusion model based on Gaussian distribution is introduced on the basis of the burning range. A smoke concentration at a certain point within the fire range is $$C = C_0 + S * e^{\frac{-r^2}{b}} * T_{WS} T_{WW} T_{WF},$$

where $C_0$ represents a smoke concentration value under current natural conditions, $T_{WS}$ represents a wind speed influence coefficient, $T_{WW}$ represents a wind direction influence coefficient, $T_{WF}$ represents a humidity influence coefficient, S represents a smoke intensity of a fire point source, b represents Gaussian distribution parameters, and r represents a distance from the fire point source. This step is based on a computer to perform calculations at each point, efficient and quick traversal can be performed and calculations can be repeated, and the concentration of dense smoke at each point can be obtained. A smoke concentration of each place inside a fire scene and a smoke concentration of a residential area outside the fire scene are calculated, residents in an affected residential area are organized to evacuate, and a relief route that is less affected by the smoke is designed for firefighting personnel.

Example 1

In step S4, smoke concentrations are calculated for a location E inside a forest farm and a location F outside a burning range of the forest farm. A smoke concentration of the forest farm is 0 under natural conditions. For the location E inside the fire scene, a smoke intensity of a place nearest a fire source is 30, and the smoke concentration based on the location E is calculated to be $$C_E = 30 * e^{\frac{-2^2}{2}} * 2.6 * 8.5 * 3.5 = 312 \ pmm.$$

For the location F outside the fire scene, a smoke intensity of a place nearest the fire source is 10, $$C_F = 10 * e^{\frac{-4^2}{2}} * 2.6 * 8.5 * 3.5 = 0.25 \ pmm.$$

The location E inside the fire scene has a higher smoke concentration and is unsuitable for traffic. A residential area at the location F outside the fire scene has a lower smoke concentration and is not affected.

Example 2

In step S1, a gravitational field in a potential field is constructed, $$\rho_{att}(q) = \frac{1}{2}\delta\|q - q_f\|^2.$$

δ represents a gravitational gain and is fitted to 0.04. q represents a location of a current point (2, 2). $q_f$ represents a location of a target point (25, 27). The gravitational field expresses an attraction effect of a target to creatures. The gravitational field is expressed as $$\rho_{att}(q) = \frac{1}{2} * 0.04 * (625 + 259) = 23.08$$

at the point (2, 2).

A repulsive field in the potential field is constructed to express an repulsive effect of an obstacle on the creatures. ρ(q) represents a distance from the creatures to a boundary of the obstacle, and is set to 0.4. q' represents a location of the obstacle and is located within the boundary of an obstacle area, and a function of a repulsive potential field is obtained, $$\rho_{rep}(q) = \begin{cases} \frac{1}{2} * 0.7\left(\frac{1}{0.4} - \frac{1}{0.8}\right)^2 & : p(q) \le p_0.\ p_0 \\ 0 : p(q) > p_0 \end{cases}$$

represents a distance affected by the obstacle and is set to 0.8. γ represents a repulsive gain and is fitted to 0.7. The repulsive field is expressed as $$\rho_{rep}(q) = \frac{1}{2} * 0.7\left(\frac{1}{0.4} - \frac{1}{0.8}\right)^2 = 0.546$$

at the point (2, 2).

In S103, the potential field is constructed, and a potential field at the point (2, 2) is ρ(q)=22.534. The potential field is a sum of the gravitational field and the repulsive field.

In S104, a trajectory is solved using a gradient descent method: from an initial configuration, a length of 0.7 is traveled in a direction of a negative gradient of the potential field, which is repeated at a new configuration, and a length of 0.7 is traveled in the direction of the negative gradient of the potential field until a final configuration point is reached. An iterative algorithm of the gradient descent method is described in detail below.

In S104_1: from a starting point, a length of 1 is traveled in the direction of the negative gradient of the potential field, $q_{init}$→$q_0$, 0→i. From an initial point to the first constructed point, i is assigned a value of 0.

In S104_2, after iterative calculations are performed by software for several times, an array <(2,2), (4,7), (15,16), (16,17), (20,20), (25,27)> is outputted. An array of construction points containing the results of each iteration is a final activity path obtained by planning.

It is to be noted that: the above are only preferred examples of the present disclosure and are not used to limit the present disclosure. Although the present disclosure is described in detail by reference to the examples mentioned above, for those skilled in the art, the technical solutions recorded in the examples mentioned above can be modified or some technical features can be equivalently replaced. Any modifications, equivalent replacements and improvements made within the spirit and principle of the present disclosure are included in the scope of protection of the present disclosure.

The invention claimed is:

1. A multi-layer warning and monitoring system for forest fire prevention, comprising a forest area monitoring module, an environmental warning module and an aerial photography monitoring module, the forest area monitoring module being configured to, by using monitoring and alarm devices comprising at least one of a humidity sensor, a high temperature monitor, a movable camera and an infrared monitor, arrange the monitoring and alarm devices on the basis of a current geographic location and forest farm information of a forest farm, including trees characteristics and distribution locations, to monitor and detect combustible objects in an area of high human activity, the environmental warning module comprising temperature detectors, humidity detectors and a data interface configured to acquire weather forecasts, wherein the environmental warning module is configured to carry out warning of high temperature and persistent drought conditions according to the weather forecasts, and the aerial photography monitoring module being configured to carry out fire monitoring, fire spread analysis, and calculation of dense smoke intensity and spread range on the basis of images taken by an aerial equipment external to the system.

2. The multi-layer warning and monitoring system for forest fire prevention according to claim 1, wherein the forest area monitoring module comprises an area monitoring unit, an image monitoring unit and a device management unit, the area monitoring unit being configured to acquire a geographic location of a current forest area by utilizing a positioning system, read, from a database, species and number of trees of a forest in a corresponding forest area, and arrange the monitoring and alarm devices at geographic locations in the current forest area based on the species and the number of trees, the image monitoring unit being configured to identify flammable points and high heat locations by means of an infrared lens to detect burning hazards, and the device management unit being configured to manage the monitoring and alarm devices in the area.

3. The multi-layer warning and monitoring system for forest fire prevention according to claim 1, wherein the environmental warning module comprises a temperature warning unit, a drought warning unit and a wind force warning unit, the temperature warning unit being configured to monitor temperature conditions in a forest by means of temperature detectors in the forest farm, alarm for continuous high temperature conditions and extreme high temperature conditions, collect weather information from a meteorological website, and regulate and control risk levels of a fire warning through the prediction of future temperature conditions, the drought warning unit being configured to detect humidity conditions in the forest farm by means of humidity detectors in the forest farm, and predict drought duration in combination with precipitation information, and the wind force warning unit being configured to be turned on under drought and high temperature conditions to monitor a wind force and a wind direction at a present day, and determine the impact of the wind force on the area.

4. The multi-layer warning and monitoring system for forest fire prevention according to claim 1, wherein the aerial photography monitoring module comprises an information acquisition unit, an image analysis unit and an intelligent pre-determination unit, the information acquisition unit being configured to acquire open image resources of remote sensing in real time from different satellites and the aerial equipment external to the system, and download the open image resources of remote sensing to a local system, the image analysis unit being configured to retrieve images of a fire scene, and analyze the images of the fire scene to study and determine a burning range and spread direction of a fire, and the intelligent pre-determination unit being configured to determine burning duration and an influence range of dense smoke of the fire on the basis of analysis results of the image analysis unit, and provide a plan direction for a firefighting plan.

5. A multi-layer warning and monitoring method for forest fire prevention, comprising the following steps of:

S1. acquiring geographic location and forest farm information about an area, including characteristics and distribution locations of trees in the area, and arranging monitoring and alarm devices in the area based on the geographic location and the forest farm information;

S2. inspecting and identifying flammable points and high heat areas in a forest farm to detect burning hazards;

S3. capturing temperature and humidity data in the forest farm to study and determine fire warning levels in combination with meteorological conditions; and wherein in step S3, an environmental warning module captures meteorological information from a meteorological website about the forest farm on the basis of area information about the forest farm located by a system, and determines the possibility of inducing a forest fire event according to precipitation, temperature, wind speed and relative humidity; and combined with a forest fire spread formula, the fire warning level is increased upon a forest fire spread rate R under the meteorological conditions exceeds a threshold value;

S4. acquiring thermal imaging images of a fire scene, analyzing the thermal imaging images to determine a fire spread direction, and determining a burning duration and a final influence range of a fire based on analysis results of the thermal imaging images;

wherein in step S4, for the forest farm where the fire breaks out, the system instantly captures data upon obtaining alarm information from the monitoring and alarm devices, locates nearest aerial equipment, and requests for image information about the forest farm; a burning range is obtained on the basis of the forest fire spread rate in step S3; and a fire smoke diffusion model based on Gaussian distribution is introduced on the basis of the burning range to calculate a smoke concentration of each place inside the fire scene and a smoke concentration of a residential area outside the fire scene to evacuate residents in an affected residential area.

6. The multi-layer warning and monitoring method for forest fire prevention according to claim 5, wherein the step S1 further comprises: locating the area where the forest farm is located, calculating the losses caused by the fire in the forest farm according to a type and size of the forest farm, prioritizing warning and monitoring, and arranging the monitoring and alarm devices according to the characteristics and distribution locations of trees in the forest farm;

wherein in step S1, a device management unit is configured to arrange the monitoring and alarm devices based on human activity frequency within the forest area, comprising:

demarcating target points of an activity area in the forest farm to predict and plan an activity path of the human, and arranging the monitoring and alarm devices along the activity path;

wherein the activity path is established using an artificial potential field algorithm, with the steps as follows:

S101: constructing a gravitational field in a potential field, the gravitational field expressing an attraction effect of a target on the creatures;

S102: constructing a repulsive field in the potential field to express a repulsive effect of an obstacle on the target;

S103: constructing the potential field, the potential field $\rho(q)=\rho_{att}(q)+\rho_{rep}(q)$, the potential field being a sum of the gravitational field and the repulsive field; and

S104: solving the activity path using a gradient descent method: from an initial construction, advancing a length of m in a direction of a negative gradient of the potential field, repeating at a new construction, and advancing a length of m in the direction of the negative gradient of the potential field until a final construction point is reached; and after the path is planned, the monitoring and alarm devices are arranged on the activity path in accordance with construction points, and at the same time, the monitoring and alarm devices are arranged at an intermediate point taken between two construction points which are farther apart according to distances between the construction points, the monitoring and alarm devices comprising a humidity sensor, a high temperature monitor, a movable camera and an infrared monitor, and each of the alarm devices comprising a signal module for communicating with a system.

7. The multi-layer warning and monitoring method for forest fire prevention according to claim 5, wherein in step S2, the monitoring and alarm devices are utilized to detect high temperature and flammable points in an area within the forest farm, and identify reflective objects and flammable objects by images; an image detection unit is based on an intelligent camera to initially monitor an abnormal temperature on a surface of an object by means of a temperature-sensitive lens, and alarm for a temperature exceeding a threshold value; in a smoldering stage, smoke emitted from the object is identified and alarm is performed on the basis of a smoke detection instrument; in a burning stage, a flame is detected on the basis of a visible light camera, indicating that a fire is initially formed, and the monitoring and alarm devices alarm and upload fire information including location information and fire pictures.

* * * * *